No. 746,320. Patented December 8, 1903.

UNITED STATES PATENT OFFICE.

HERMAN E. FREES, OF CHICAGO, ILLINOIS, ASSIGNOR TO WAHL & HENIUS, OF CHICAGO, ILLINOIS, A CORPORATION OF ILLINOIS.

PROCESS OF BREWING.

SPECIFICATION forming part of Letters Patent No. 746,320, dated December 8, 1903.

Application filed June 27, 1903. Serial No. 163,333. (No specimens.)

*To all whom it may concern:*

Be it known that I, HERMAN E. FREES, a citizen of the United States, residing at Chicago, in the county of Cook and State of Illinois, have invented a new and useful Improvement in the Art of Brewing, of which the following is a specification.

The object of my invention is to enable corn, more particularly maize, (but including other cereals used in brewing,) ground in its natural state, to be used in preparing the mash instead of requiring it to be degerminated and the husk to be removed, as it is the common practice to do.

Unprepared raw corn is objectionable for brewing purposes because of the disagreeable taste it imparts to the beer, due to the oil it contains, amounting to four to five per cent., principally in the germ and the cells close to the husk, so that removal of the germ and husk removes from the corn the greater part of the oil. The removal of these parts, which is accomplished by special machinery designed for the purpose and produces hominy, adds materially to the cost of the cereal for brewing purposes and does not effect entire removal of the objectionable oil, for the hominy, which is sold according to the degree of its fineness as "coarse grits," "fine grits," "meal," or "flour," contains some oil, the quantity of which varies, according to the degree of fineness of the cereal, from about one-half of one per cent. to about two and one-half per cent.

In the ordinary practice of brewing most of the fatty oil of the corn is intercepted in the grains by straining off the wort through them, though some of this oil gets into the wort, but is not objectionable, because it does not impart to the beer a strong corn taste. There is, however, in the four to five per cent. of corn-oil referred to a very small portion which I believe to be an essential or ethereal oil, which characterizes the corn flavor in the corn-oil and which if allowed to enter the wort imparts to it an undesirable corn flavor. The immediate purpose of my invention is to prevent this particular portion of the oil contents of the corn from entering the wort by saponifying that portion, thereby to adapt it be intercepted by the grains in drawing off the wort. This objectionable portion of the oil contents is hereinafter characterized as "soluble," because the boiling of the mash in the cooker reduces that oil to such a finely-divided condition that it permeates the liquor and is substantially in solution.

My invention consists in the treatment to which I subject the corn to remove its soluble oil contents and in the manner of applying the treatment in preparing the mash—namely, by saponifying the soluble oil and intercepting the soap product in the grains residue of the mash in drawing off the wort.

To practice my improvement, I employ a suitable alkaline earth, preferably calcium oxid, which will reduce the soluble oil contents of the corn to an insoluble soap. I add the calcium oxid to and thoroughly mix it with the water and the corn, ground in its natural state—that is to say, with its germs and husks, and therefore containing all of its oil—using by preference about one pound, more or less, of the alkaline substance to five thousand pounds, more or less, of the ground cereal, preferably doing this in the cooker; although the proportion of the alkaline substance employed will vary according to the character of the corn and the quantity of the oil contents to be saponified. It will be understood that in mentioning proportions the character of the water used is not taken into consideration, so that where the water is rich in mineral substances with which the alkaline substance combines enough of the latter should be added to neutralize such mineral substances. The alkali is added, either in a dry or a wet state, to the cold-water contents of the cooker, (of which it is customary to use about 1.2 barrels to each one hundred pounds of corn,) with which it is thoroughly mixed. After this the unprepared ground raw cereal is introduced, and the mash is thereupon conducted in the same manner as when prepared cereal, such as grits, is used—namely, by mashing and cooking the cereal with the usual admixture of malt, running the contents of the cooker into a malt-mash, mashing the mixture in a mash-tun, and drawing off the wort for further usual or suitable treatment to produce beer.

The action of the alkaline substance on the cereal is to reduce its contained soluble oil to an insoluble soap, which is effectively withheld from the wort in drawing it off by being intercepted by the grains in the mash-tun. The treatment relieves the cereal of its contained soluble oil without any considerable labor or trouble and at an expense which is insignificant compared with that of preparing the cereal in the manner commonly employed, as hereinbefore stated, or by flaking the grits or meal, which is another, but even more expensive, form of preparing the cereal, adapting it to be used directly in the mash-tun, since its starch constituent is gelatinized by the process of manufacturing it and is readily acted upon by the malt diastase.

What I claim as new, and desire to secure by Letters Patent, is—

1. In brewing beer, the process of removing from corn its contained soluble oil, which consists in mixing with the ground corn an alkaline earth and water and cooking the mixture, thereby reducing the soluble oil contents to an insoluble soap, mashing the cereal, drawing off the wort and intercepting the soap in the grains from which the wort is separated.

2. In brewing beer, the process of removing from corn its contained soluble oil, which consists in mixing with the ground corn calcium oxid and water and cooking the mixture, thereby reducing the soluble-oil contents to an insoluble soap, mashing the cereal, drawing off the wort and intercepting the soap in the grains from which the wort is separated.

HERMAN E. FREES.

In presence of—
WALTER N. WINBERG,
ALBERT D. BACCI.